United States Patent
Malouin et al.

(10) Patent No.: US 9,258,056 B2
(45) Date of Patent: Feb. 9, 2016

(54) METHODS AND APPARATUS FOR MONITORING AND CONTROLLING THE PERFORMANCE OF OPTICAL COMMUNICATION SYSTEMS

(71) Applicant: JUNIPER NETWORKS, INC., Sunnyvale, CA (US)

(72) Inventors: Christian Malouin, San Jose, CA (US); Roberto Marcoccia, San Jose, CA (US); George R. Sosnowski, Sunnyvale, CA (US); Theodore J. Schmidt, Gilroy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 79 days.

(21) Appl. No.: 14/150,107

(22) Filed: Jan. 8, 2014

(65) Prior Publication Data

US 2015/0180570 A1    Jun. 25, 2015

Related U.S. Application Data

(60) Provisional application No. 61/919,361, filed on Dec. 20, 2013.

(51) Int. Cl.
*H04B 10/079* (2013.01)

(52) U.S. Cl.
CPC ...... *H04B 10/0795* (2013.01); *H04B 10/07955* (2013.01)

(58) Field of Classification Search
CPC ............... H04B 10/0795; H04B 10/07955; H04B 10/0799
See application file for complete search history.

(56) References Cited

U.S. PATENT DOCUMENTS

| | | | | |
|---|---|---|---|---|
| 5,812,572 A * | 9/1998 | King et al. | | 372/38.04 |
| 6,480,315 B1 * | 11/2002 | Brown | | 398/202 |
| 7,876,797 B2 * | 1/2011 | Sanchez | | 372/38.02 |
| 2003/0018453 A1 | 1/2003 | Carrick | | |
| 2006/0120720 A1 | 6/2006 | Hauenschild | | |
| 2008/0128587 A1 | 6/2008 | Lyu | | |
| 2012/0106953 A1 * | 5/2012 | Nguyen et al. | | 398/38 |
| 2012/0251104 A1 * | 10/2012 | Oberland | | 398/38 |
| 2013/0039663 A1 * | 2/2013 | LaBounty et al. | | 398/116 |
| 2013/0251361 A1 | 9/2013 | Azadeh | | |

OTHER PUBLICATIONS

Extended European Search Report for European Patent Application No. 14199101.8, mailed Jun. 2, 2015.

* cited by examiner

*Primary Examiner* — Leslie Pascal
(74) *Attorney, Agent, or Firm* — Cooley LLP

(57) ABSTRACT

In some embodiments, an apparatus includes an optical detector that can sample asynchronously an optical signal from an optical component that can be either an optical transmitter or an optical receiver. In such embodiments, the apparatus also includes a processor operatively coupled to the optical detector, where the processor can calculate a metric value of the optical signal without an extinction ratio of the optical signal being measured. The metric value is proportional to the extinction ratio of the optical signal. In such embodiments, the processor can define an error signal based on the metric value of the optical signal and the processor can send the error signal to the optical transmitter such that the optical transmitter modifies an output optical signal.

20 Claims, 7 Drawing Sheets

600

METHODS AND APPARATUS FOR MONITORING AND CONTROLLING THE PERFORMANCE OF OPTICAL COMMUNICATION SYSTEMS

CROSS-REFERENCE TO RELATED APPLICATIONS

This application claims priority to and the benefit of U.S. Provisional Patent Application Ser. No. 61/919,361 entitled "Methods and Apparatus for Monitoring and Controlling the Performance of Optical Communication Systems," filed Dec. 20, 2013, the disclosure of which is incorporated herein by reference in its entirety.

BACKGROUND

Some embodiments described herein relate generally to methods and apparatus for monitoring and controlling the performance of optical communication systems. In particular, but not by way of limitation, some embodiments described herein relate to methods and apparatus for detecting metric values related to the extinction ratio and performing corrections in optical communication systems based on the same.

The extinction ratio (ER) of an optical communication system that includes an optical source (or optical transmitter) and an optical detector (or optical receiver) is the ratio of two optical power levels of a digital signal generated by an optical source such as, for example, a laser diode or an external modulator. One of the two optical power levels is the average optical power level generated when the optical source is in a first configuration (e.g., an "on" configuration that denotes a binary "1" power level). The other of the two optical power levels is the average optical power level generated when the optical source is in a second configuration (e.g., an "off" configuration that denotes a binary "0" power level). The system performance of an optical communication system can be considered as a function of the ER. Therefore, detecting, monitoring and controlling the ER can enhance the performance of optical communication systems such as, for example, high speed communication systems.

Known methods of detecting the ER of an optical communication system typically involves implementing a high bandwidth sampling technique (where the sampling rate is at least equal to or greater than the bit rate of the optical signal to be measured), uses an oscilloscope with synchronous sampling (i.e., using a repetitive "clock" signal generated at the optical source or recovered from the oscilloscope input) to establish the temporal location of the binary "0" power level and the binary "1" power level. This location is called the "center of the eye". Once the "center of the eye" is located, the power level of the binary "0" and the binary "1" can be measured, and thus ER can be calculated.

Such known methods of detecting the ER of an optical communication system are typically cumbersome. Additionally, synchronous ER detection is typically implemented using high bandwidth electronics (e.g., a piece of test equipment), which are typically costly and typically use a large amount of space.

Accordingly, a need exists for methods and apparatus to measure, monitor and control the performance of an optical communication system using asynchronous detection that do not use a "clock" signal and high bandwidth electronics for sampling optical signals of the optical communication system.

SUMMARY

In some embodiments, an apparatus includes an optical detector that can sample asynchronously an optical signal from an optical component that can be either an optical transmitter or an optical receiver. In such embodiments, the apparatus also includes a processor operatively coupled to the optical detector, where the processor can calculate a metric value of the optical signal without an extinction ratio of the optical signal being measured. The metric value is proportional to the extinction ratio of the optical signal. In such embodiments, the processor can define an error signal based on the metric value of the optical signal and the processor can send the error signal to the optical transmitter such that the optical transmitter modifies an output optical signal.

DETAILED DESCRIPTION

In some embodiments, an apparatus includes an optical detector that can sample asynchronously an optical signal from an optical component that can be either an optical transmitter or an optical receiver. In such embodiments, the apparatus also includes a processor operatively coupled to the optical detector, where the processor can calculate a metric value of the optical signal without an extinction ratio of the optical signal being measured. The metric value is proportional to the extinction ratio of the optical signal. In such embodiments, the processor can define an error signal based on the metric value of the optical signal and the processor can send the error signal to the optical transmitter such that the optical transmitter modifies an output optical signal.

In some embodiments, a method includes sampling asynchronously a first optical signal, and calculating a metric value of the optical signal without measuring an extinction ratio of the optical signal, where the metric value is proportional to the extinction ratio of the optical signal. In such embodiments, the method includes defining an error signal based on the metric value and sending the error signal such that a second optical signal is defined based on the first optical signal and the error signal.

In some embodiments, an apparatus includes an optical system having at least one of an optical transmitter or an optical receiver. In such embodiments, the optical system also includes an optical detector and a processor operatively coupled to the optical detector, where the optical detector can asynchronously sample a first optical signal. In such embodiments, the processor can calculate a metric value of the first optical signal without the optical system measuring an extinction ratio of the first optical signal, where the metric value is proportional to the extinction ratio of the first optical signal. In such embodiments, the processor can define an error signal based on the metric value of the first optical signal and the optical system can modify a second optical signal based on the error signal.

The optical communication systems described herein can be, for example, incoherent systems (also called direct-detection systems) that use the intensity of the light signals (optical signals) for transmitting and/or receiving data.

As used in this specification, the singular forms "a," "an" and "the" include plural referents unless the context clearly dictates otherwise. Thus, for example, the term "an optical detector" is intended to mean a single optical detector or a combination of optical detectors.

Figure 1:
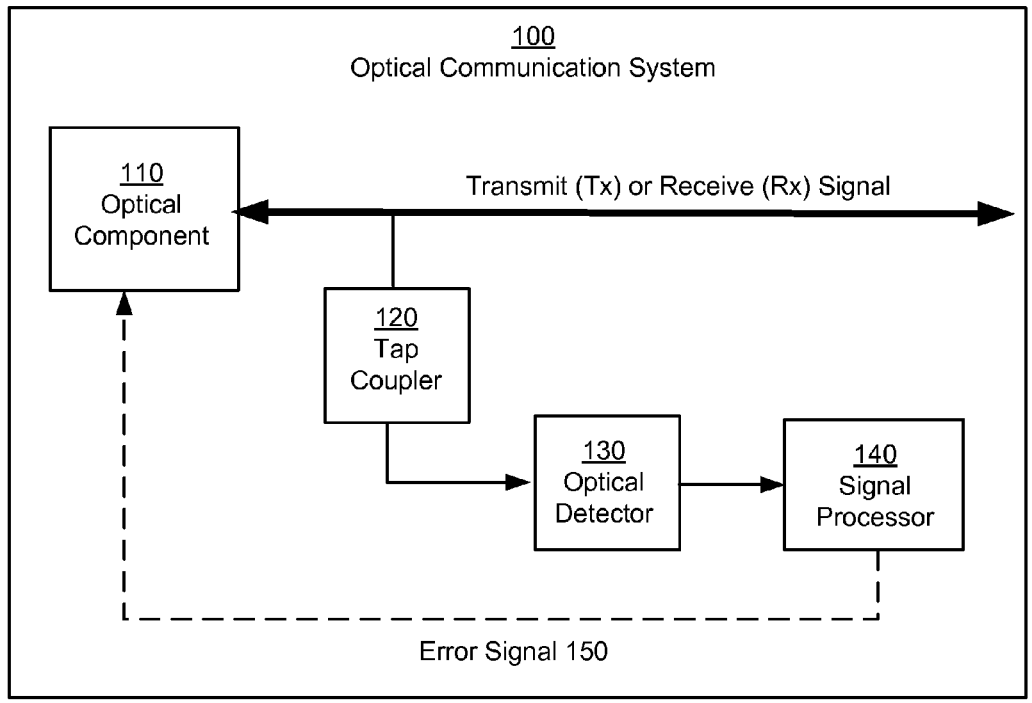
FIG. 1 is a logical block diagram of an optical communication system that uses asynchronous detection, according to an embodiment.

FIG. 1 is a logical block diagram of an optical communication system that uses asynchronous detection, according to an embodiment. The optical communication system 100 includes an optical component 110, a tap coupler 120, an optical detector 130 and a signal processor 140. The optical component 110 can be a direct-detection modulation format optical transmitter and/or optical receiver that use the intensity of optical signals for transmitting and/or receiving data. An example of a direct-detection modulation format can be on-off keying (OOK) modulation. The tap coupler 120 can be used to split a portion of the transmitted optical signal (e.g., marked as "$T_x$" in FIG. 1) or the received optical signal (e.g., marked as "$R_x$" in FIG. 1), and send that portion of the transmitted optical signal or the optical received signal to the optical detector 130. The tap coupler 120 can be, for example, a polarization beam splitter, a polarization maintaining splitter, a 50-50 beam splitter, a dichroic mirrored prism, and/or the like.

The optical detector 130 can be, for example, a photomultiplier tube (PMT), a charge coupled device (CCD) camera, a photodiode detector, a pixel array detector, and/or the like. The optical detector 130 can receive the portion of the transmitted optical signal or the received optical signal from the tap coupler 120 and can detect amplitude of the optical signal. Additionally, the optical detector 130 can asynchronously sample the optical signal to detect the time-based amplitude variations in the optical signal. The optical detector 130 can send to the signal processor 140 a signal that represents the amplitude of the detected optical signal and the time-based amplitude variations in the detected optical signal.

The signal processor 140 can be, for example, a general purpose processor, a Field Programmable Gate Array (FPGA), an Application Specific Integrated Circuit (ASIC), a Digital Signal Processor (DSP), and/or the like. The signal processor 140 can run and/or execute processes and/or other modules, processes and/or functions associated with measuring, monitoring and controlling the performance of the optical communication system 100. The signal processor 140 is operatively coupled to the optical component 110. As discussed further below, the signal processor 140 can calculate a metric value of the optical signal transmitted by the optical component 110 and/or received by the optical component 110 without an extinction ratio of the optical signal being measured. The metric value can be, for example, (1) the variance ($\sigma^2$) of the time-domain optical signal, (2) the standard deviation ($\sigma$) of the time-domain optical signal, (3) the peak-peak value (max(x)-min(x)) of the time-domain optical signal, or (4) the background power of the frequency-domain optical signal. The signal processor 140 can also calculate a calibration value of the optical signal if the bit rate of the optical signal is greater than the analog bandwidth of the optical detection system (that includes the optical detector 130 and the signal processor 140) and if a sampling frequency of the optical signal is not less than the analog bandwidth of the optical signal.

The signal processor 140 can define an error signal based on the metric value and calibration value of the optical signal. The signal processor 140 can send the error signal to the optical component 110 (either an optical transmitter or an optical receiver) such that the optical component 110 can modify a subsequent (or second) optical signal transmitted by the optical component 110 and/or an optical signal received by the optical component 110. The signal processor 140 can send the error signal to the optical component 110 such that the extinction ratio of the subsequent (or second) optical signal transmitted by the optical component 110 is within a pre-defined range. The error signal can be, for example, a feedback signal generated by the signal processor 140 that is indicative or representative of the extinction ratio of a first optical signal. In some instances, the error signal can also or alternatively represent information associated with adjustments to be made at the optical component 110 (e.g., optical transmitter) to modify a second output signal such that the ER of the second output signal falls within the pre-determined ER range that is indicative of optimal or improved system performance.

The optical communication system 100 can also include other components or connected to other components not shown in FIG. 1. Such components can include, for example, optical fibers and/or links and/or waveguides coupled with the optical component 110 that can be involved in the transmission and/or reception of the optical signals from the optical component 110. Additionally, the optical component 110 can also be operatively coupled to other parts or components of a network, the processor associated with an optical transmitter, a processor associated with an optical receiver, and/or the like. The tap coupler 120 can also be connected to optical fibers and/or links and/or waveguides to extract a portion of the optical signal transmitted and/or received by the optical component 110.

Figure 2:
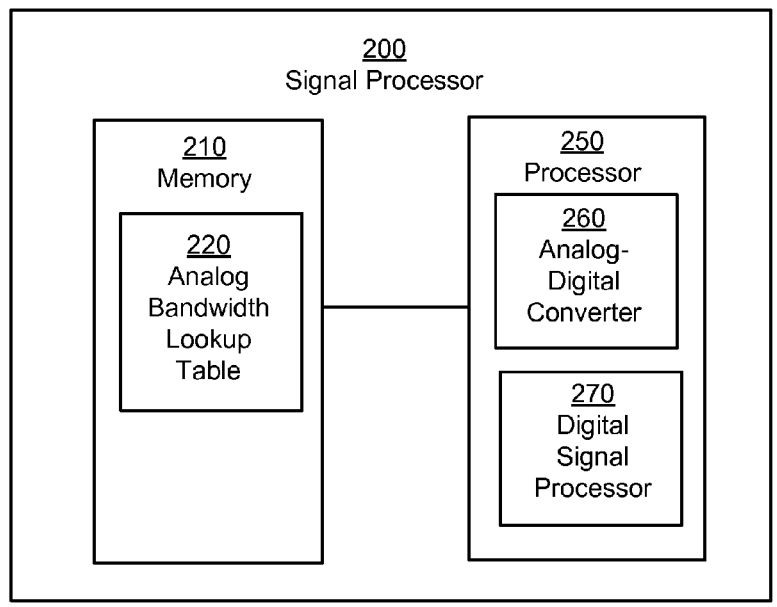
FIG. 2 is a system block diagram of a signal processor, according to an embodiment.

FIG. 2 is a system block diagram of a signal processor, according to an embodiment. The signal processor 200 includes a memory 210 and a processor 250 coupled to the memory 210. The memory 210 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 210 can store instructions to cause the processor 250 to execute modules, processes and/or functions associated with the signal processor 200. The memory 210 includes an analog bandwidth look-up table 220. The analog bandwidth look-up table 220 can be a look-up table or database that stores the values of the analogue bandwidth ($B_e$) of the optical communication system as a function of the calibration value $\eta$, where $\eta$ is defined as: $\eta(dB^{-1})=K\sqrt{B_e(MHz)}$, where K is a proportionality constant that depends on the signal modulation format and the bit rate of the optical communication system. For example, in some instances, for an OOK modulation format and a bit rate (R) of 10.3 Gb/sec, the value of the proportionality constant K can be 0.001315 dB$^{-1}$/ $\sqrt{(\text{MHz})}$. An example of the variation of η as a function of the analog bandwidth of the optical communication system is discussed in greater detail below in connection with FIG. 6. In some instances, the value of the proportionality constant K is stored in the signal processor 200 during manufacture.

The processor 250 can be, for example, a general purpose processor, a Field Programmable Gate Array (FPGA), an Application Specific Integrated Circuit (ASIC), a Digital Signal Processor (DSP), and/or the like. The processor 250 can run and/or execute application processes and/or other modules, processes and/or functions associated with the signal processor 200 and/or the optical communication system (e.g., optical communication system 100 of FIG. 1). The processor 250 includes an analog-digital converter 260 and a digital signal processor 270. The analog-digital converter 260 (ADC) converts the analog electrical data streams received from the optical detector (e.g., optical detector 130 in FIG. 1) into digital electrical data streams.

The digital signal processor 270 can process the detected optical signal, and can calculate a metric value of the optical signal and a calibration value of the optical signal without an extinction ratio of the optical signal being measured, where the metric value is proportional to the extinction ratio of the optical signal. The digital signal processor 270 can define an error signal based on the metric value and calibration value of the optical signal. The digital signal processor 270 can send the error signal to an optical component (e.g., optical transmitter or optical receiver 110) such that the optical component can modify a subsequently transmitted output optical signal and/or a received optical signal. The digital signal processor 270 can send the error signal to the optical component such that an extinction ratio of the subsequently transmitted optical signal (and/or received optical signal) of the optical component is within a pre-defined range. The digital processor 270 can calculate the calibration value of the detected optical signal if the bit rate of the detected optical signal (R) is greater than an analog bandwidth ($B_e$) of the optical detector (R>>$B_e$) and if a sampling frequency of the optical signal ($F_s$) is not less than the analog bandwidth of the optical detector ($F_s \geq B_e$).

Figure 3:
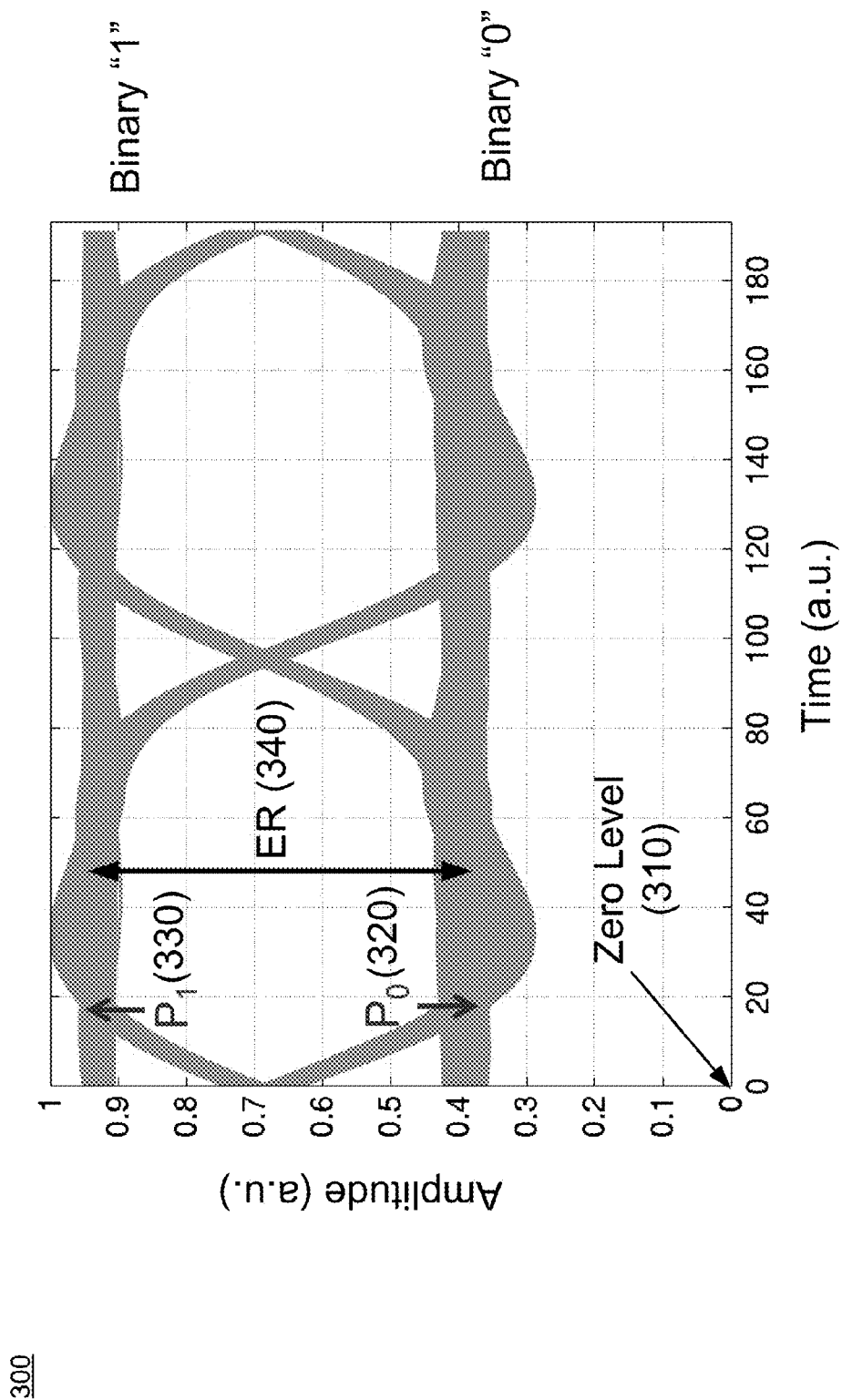
FIG. 3 is a graphical example of a time-domain eye diagram for an optical signal, according to an embodiment.

As discussed above in connection with FIGS. 1 and 2, the performance of an optical communication system can be improved by monitoring and controlling, for example, the extinction ratio of the optical communication system or metric values related to or proportional to the extinction ratio of the optical communication system. The extinction ratio of an optical communication system can be explained by a time-domain eye diagram of a digital data signal generated by, for example, an optical detector. FIG. 3 is a graphical example of a time-domain eye diagram for an optical signal, according to an embodiment. The eye diagram shown in FIG. 3 is an oscilloscope display in which a digital data signal from an optical detector is repetitively and synchronously sampled and applied to the vertical input or axis, while the data rate is used to trigger the horizontal axis sweep. Because high speed digital signals can exceed multiple Gigabits per second (Gbps) speeds, eye diagrams can provide a way to measure signal quality and system performance. The eye diagram allows different parameters that represent the quality of the data signal to be (quickly) visualized and determined. The eye diagram is constructed from a digital waveform by folding the parts of the waveform corresponding to each individual bit into a single graph with signal amplitude on the vertical axis and time on the horizontal axis.

Eye height is a measure of the vertical opening of an eye diagram. The eye height (or conversely eye closure) is an indication of noise and distortion. In FIG. 3, $P_1$ (330) represents the average power level when the optical communication system is in a first configuration (e.g., an "on" configuration that denotes a binary "1" power level). $P_0$ (320) represents the average power level when the optical communication system is in a second configuration (e.g., an "off" configuration that denotes a binary "0" power level, 350). The extinction ratio (ER) (340) of an optical communication system is the ratio of two power levels of a digital signal generated by an optical communication system and can be represented by the value of $P_1/P_0$. The system performance of an optical communication system can be considered as a function of the ER. Therefore, detecting, monitoring and controlling the ER or metric values proportional or related to the ER can be used to enhance the performance of optical communication systems such as, for example, high speed communication systems.

Figure 4:
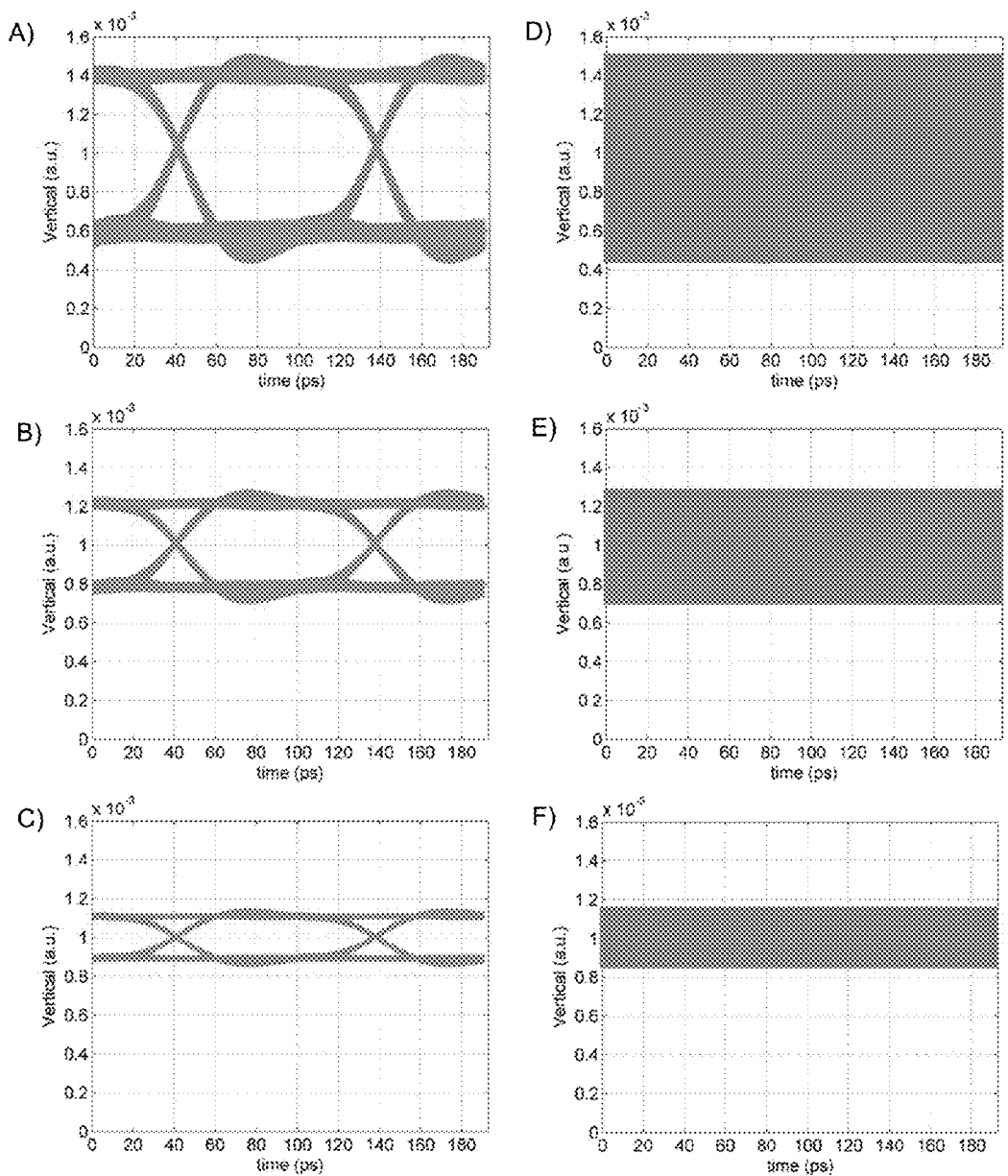
FIGS. 4A-4C represent an example of the time-domain eye diagram of a synchronously-sampled optical signal with three ERs of 4 dB, 2 dB and 1 dB, respectively.
FIGS. 4D-4F represent an example of the time-domain eye diagram of an asynchronously sampled optical signal with three ERs of 4 dB, 2 dB and 1 dB, respectively.

The time-domain eye diagram of a digital data signal generated by an optical detector in an optical communication system can show variations in the signal amplitude and signal profile for signals transmitted and/or received in an optical communication system for both synchronous detection as well as asynchronous detection methods. The variations in the signals detected are related to the ER of an optical communication system and metric values related to or proportional to the ER of an optical communication system. FIGS. 4A-4C represent an example of the time-domain eye diagram of a synchronously-sampled optical signal with three ERs of 4 dB, 2 dB and 1 dB, respectively. FIGS. 4D-4F represent an example of the time-domain eye diagram of an asynchronously sampled optical signal with three ERs of 4 dB, 2 dB and 1 dB, respectively. FIGS. 4A-4C show that the eye diagrams of the different synchronously-sampled optical signal shows different average power levels for the binary "0" state and the binary "1" states for differing values of ER. Although FIGS. 4D-4F do not show clear eye patterns for the different asynchronously-sampled optical signals, the different ER values manifest as different peak-peak amplitude values in the eye diagrams as well as different variance and standard deviation values. The value of the variance (σ2) of the time-domain optical signal when ER is 4 dB in FIG. 4D is 4.0e-5, the value of the standard deviation (σ) of the time-domain optical signal when ER is 4 dB in FIG. 4D is 6.3e-5, and the peak-peak value (max(x)-min(x)) variation of the of the time-domain optical signal when ER is 4 dB in FIG. 4D is 1.8e-2. The value of the variance (σ2) of the time-domain optical signal when ER is 2 dB in FIG. 4E is 1.1 e-5, the value of the standard deviation (σ) of the time-domain optical signal when ER is 2 dB in FIG. 4E is 3.3e-3, and the peak-peak value (max(x)-min(x)) variation of the time-domain optical signal when ER is 2 dB in FIG. 4E is 9.4e-3. The value of the variance (σ2) of the time-domain optical signal when ER is 1 dB in FIG. 4F is 2.7e-6, the value of the standard deviation (σ) of the time-domain optical signal when ER is 1 dB in FIG. 4F is 1.6e-3, and the peak-peak value (max(x) ... min(x)) variation of the time-domain optical signal when ER is 1 dB in FIG. 4E is 4.7e-3.

Figure 5:
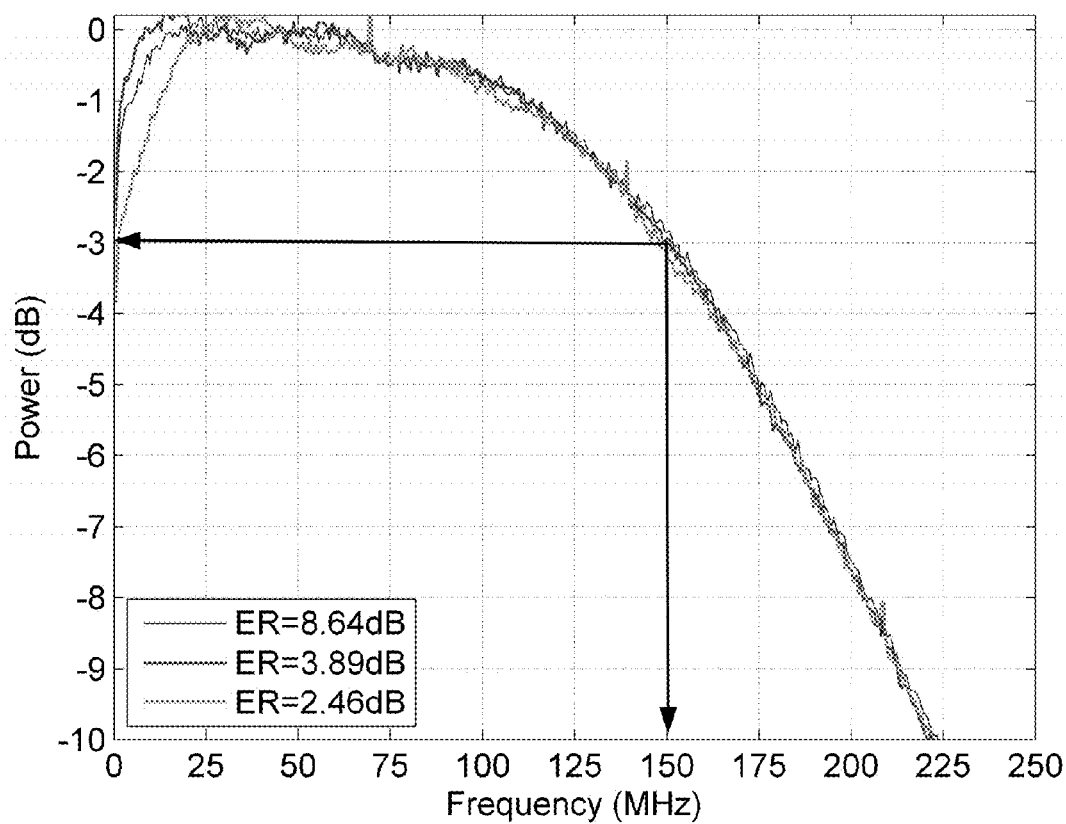
FIG. 5 is a plot of the Fourier transform of the power of broadband optical signals with three different extinction ratios, according to an embodiment.

The analog bandwidth ($B_e$) of an optical detector (or detection system) in an optical communication system can be used to estimate a calibration value that is related to the extinction ratio of the optical communication system. The analog bandwidth ($B_e$) of an optical detector (or detection system) can be calculated from the Fourier transform of the power of the detected broadband optical signal (power spectrum of the signal) under certain condition as will discussed in greater detail in relation to FIG. 5. FIG. 5 is a plot of the Fourier transform of the power of broadband optical signals with three different extinction ratios, according to an embodiment. The three different ERs associated with the signals in FIG. 5 are 8.64 dB, 3.89 dB and 2.46 dB. If the sampling frequency ($F_s$) of the analog-digital converter in an optical communication system is faster than the analog bandwidth ($B_e$) of the detection system (including the analog-digital converter and the optical detector), the −3 dB set point of the Fourier transform of the power of the detected broadband optical signal (power spectrum of the signal) can be used to calculate the value of the analog bandwidth ($B_e$) of the optical detector. If the bit rate of the optical signal (R) is greater than the analog bandwidth of the optical detector, the optical signal can be analyzed in the frequency domain to calculate the value of $B_e$. In the example of FIG. 5, the −3 dB point in the Fourier transform the broadband optical signal was used to calculate a value of $B_e$ of approximately 150 MHz. The value of analog bandwidth of the optical detection system $B_e$ can be used to compute the desired calibration value η of the optical communication system using the following equation: $\eta(dB^{-1})=K\sqrt{B_e(MHz)}$, where K is a proportionality constant that depends on the signal modulation format and the bit rate of the optical communication system. For example, in some instances, for a OOK modulation format and a bit rate (R) of 10.3 Gb/sec, the value of the proportionality constant K can be 0.001315 $dB^{-1}/\sqrt{(MHz)}$. In some instances, the value of the proportionality constant K is stored in the signal processor 200 during manufacture.

Figure 6:
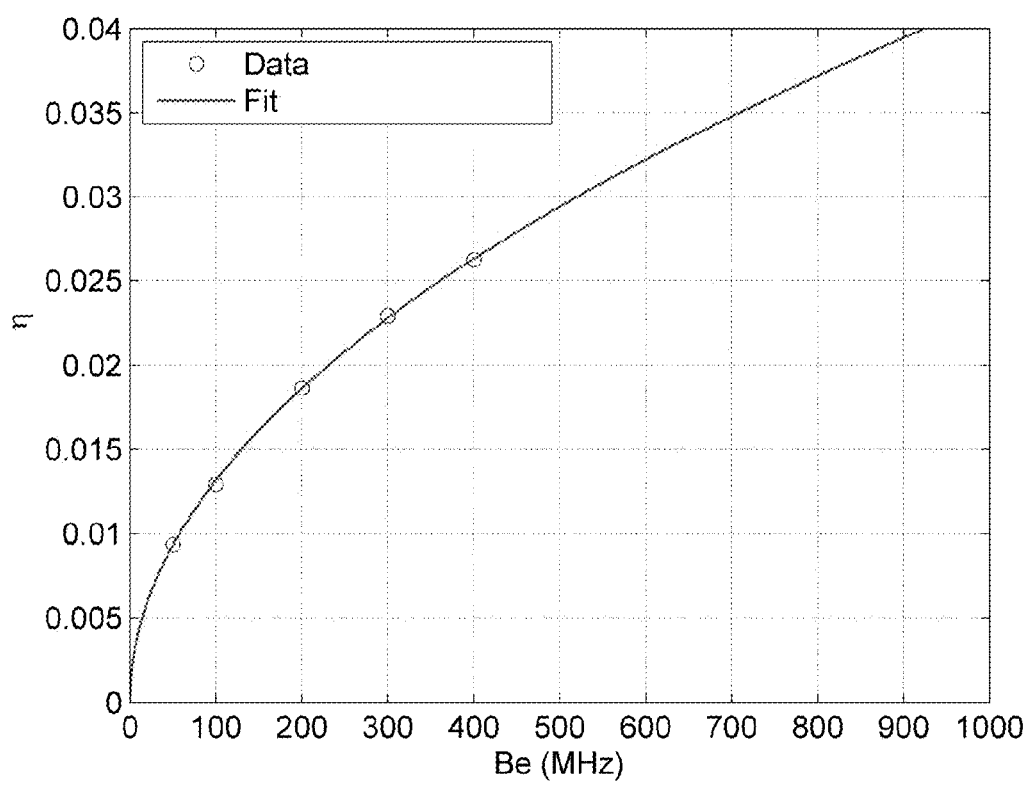
FIG. 6 is an example of the variation of the calibration value $\eta$ as a function of the analog bandwidth of the optical communication system.
Figure 7:
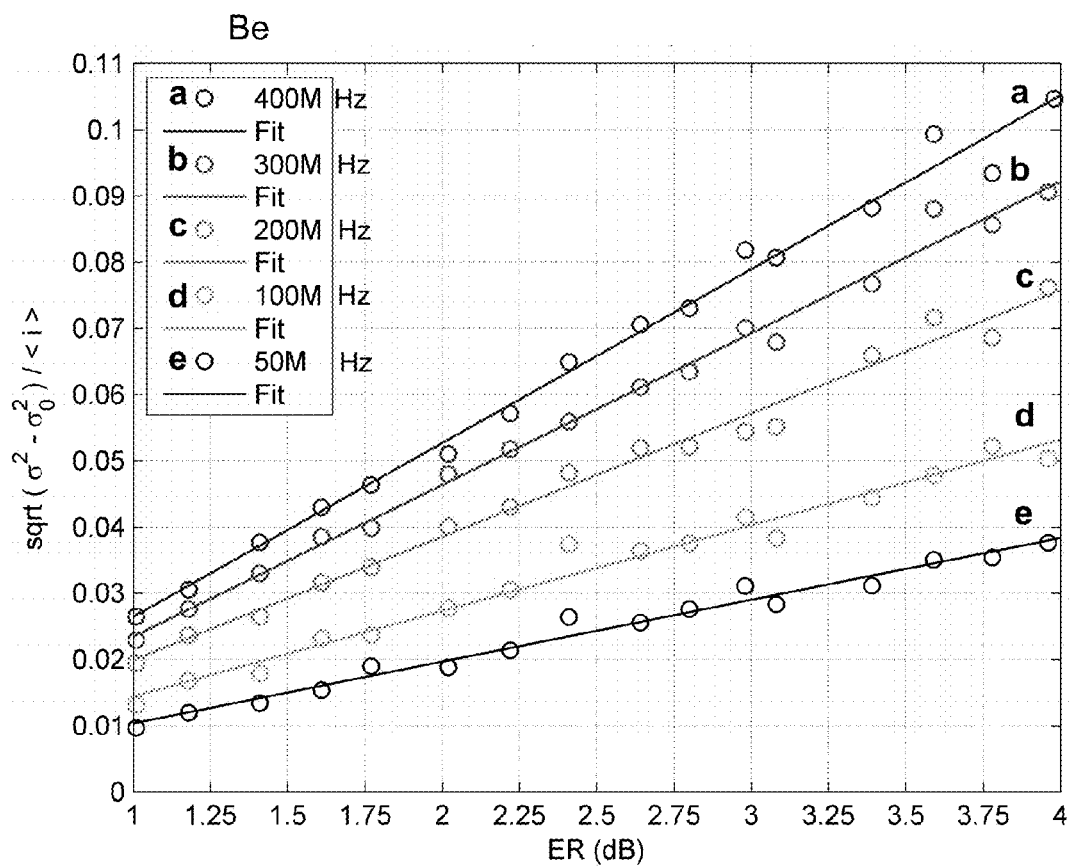
FIG. 7 shows the linear relationship between a metric value, the calibration value $\eta$ and the ER (in dB) for different values of $B_e$.

The error signal generated by the signal processor as described in FIGS. 1 and 2 is indicative of or proportional to the ER of the signal received by the optical detector (e.g., see optical detector 130 in FIG. 1). The ER, however, can be determined by the signal processor (e.g., signal processor 140 in FIG. 1) by calculating a calibration value η associated with the optical communication system as will be described in greater detail in relation to FIG. 6. FIG. 6 is an example of the variation of the analog bandwidth of the optical communication system as a function of η. The individual values of the η vs. $B_e$ (MHz) graph as shown in FIG. 6 and the values of the fit of the curve shown can be stored, for example, in a database or a look-up table in the memory of the signal processor (see analog bandwidth lookup table 220 in FIG. 2) that can be accessed by the digital signal processor (see digital signal processor 270 in FIG. 2) to compute the value of η. Because the error signal generated by the signal processor (see signal processor 130 in FIG. 1) is indicative of the ER of the signal received by the optical detector, the ER (and/or a change in ER) can be calculated by the signal processor (e.g., signal processor 140 in FIG. 1) using the following equation:

$$\Delta ER(dB) = \frac{\Delta\sigma_{norm}}{\eta(dB^{-1})}$$

where $\Delta\sigma_{norm}$ is a metric value that can be obtained from the received (or detected) optical signal and η is the calibration value. A linear relationship can exist between a metric value, the calibration value η and the ER (in dB) for different values of $B_e$ in optical communication systems. Such a linear relationship is shown in FIG. 7. Referring to FIGS. 1 and 7, after computing the ER, the signal processor can generate or define an error signal and send the error signal to the optical component. The error signal can represent information related to implementing a transformation in the optical component such that ER of a subsequent optical signal received and/or transmitted by the optical component is within a pre-defined range.

In other instances, a method of performance monitoring and control in an optical communication system can involve independently measuring ER (that can be performed during system power up/acquisition of the optical component). This measurement of the ER can be performed, for example, while also calculating the metric value $\sigma_{norm}$, i.e., simultaneously or substantially simultaneously while the ER is being measured. One or more points of the ΔER(dB) can be used to obtain $\Delta\sigma_{norm}$ as a function of ΔER(dB). Therefore, the calibration value as defined by $\eta(dB^{-1})=\Delta\sigma_{norm}/\Delta ER(dB)$ can be calculated and used during future determinations of the metric value(s) without the need of measuring ΔER at those future times. In other words, the ER can be measured (e.g., only measured once) during an initial first operation of the optical communication system, for example, during the first system power up/acquisition of the optical component. This measured ER can then be used with determination or calculation of the metric value to determine or calculate the calibration value. After the calibration value is initially determined or calculated, the calibration value can be used with a subsequently determined metric value(s) to determine or calculate the error signal at that subsequent time(s) as discussed herein.

Figure 8:
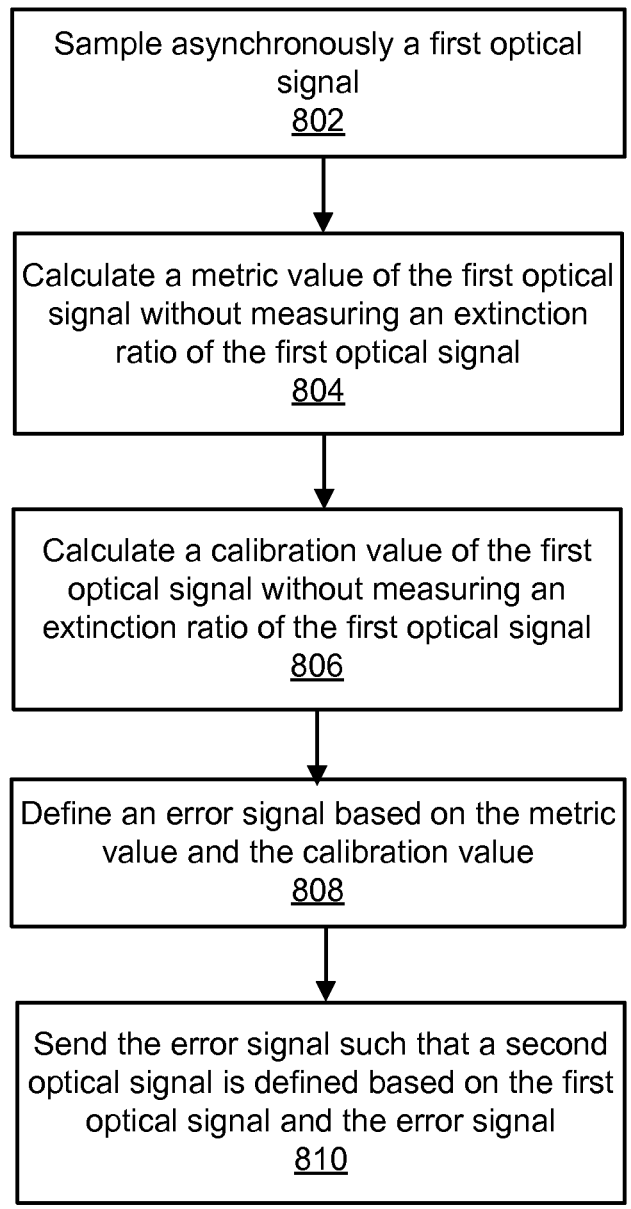
FIG. 8 is a flowchart illustrating a method for monitoring and controlling the performance of an optical communication system using asynchronous detection, according to an embodiment.

FIG. 8 is a flow chart illustrating a method for monitoring and controlling the performance of an optical communication system using asynchronous detection. The method 800 includes asynchronously sampling a first optical signal, at 802. As described above, the first optical signal can be sampled by a digital signal processor associated with the optical communication system. The first optical signal can be an optical signal transmitted by, for example, an optical transmitter or an optical signal received by an optical receiver. The first optical signal can be detected by an optical detector that can be, for example, a photomultiplier tube (PMT), a charge coupled device (CCD) camera, a photodiode detector, a pixel array detector, and/or the like.

At 804, a metric value of the first optical signal is calculated without measuring an extinction ratio of the first optical signal. As described above, the metric value can be for example (1) the variance ($\sigma^2$) of the time-domain optical signal, (2) the standard deviation (σ) of the time-domain optical signal, (3) the peak-peak value (max(x)-min(x)) of the time-domain optical signal, or (4) the background power of the frequency-domain optical signal. The metric value can be computed by, for example, a signal processor associated with the optical communication system.

At 806, a calibration value of the first optical signal is calculated without measuring an extinction ratio of the first optical signal. As described above, the calibration value can be defined based on the first optical signal if a bit rate of the first optical signal is greater than the analog bandwidth of the optical detection system that asynchronously samples the first optical signal and if the sampling frequency of the first optical signal is not less than the analog bandwidth of the optical detection system.

At 808, an error signal is defined based on the metric value and the calibration value. As described above, the error signal can be generated or defined at, for example, the signal processor 140. At 810, the error signal is sent by, for example, the signal processor, to, for example, an optical component such that a second optical signal is defined based on the first optical signal and the error signal. As described above, error signal can represent information related to implementing a transformation in the optical component such that ER of a second optical signal received and/or transmitted by the optical component is within a pre-defined range. Said in another way, for analog transmission, the first optical signal can be defined as a portion of the output optical signal generated at time $t_1$, and the second optical signal is defined as a portion of the output optical signal generated at time $t_2$, where $t_2$ occurs after $t_1$. Note that in some instances, the first optical signal and the second optical signal can be different portions of a continuous signal, and in other instances, the first optical signal and the second optical signal can be separate pulsed signals.

The method to monitor and control the performance of an optical communication system using asynchronous detection described thus far can involve low bandwidth detection (e.g., for optical system bit rates R of 10 Gb/s, Be>300 MHz), can use asynchronous detection (where no clock signals are needed), and can be used to measure ER in the digital domain and analog domain. Additionally, the signal proportional to or indicative of ER can be calculated in the time domain (using variance, standard deviation, peak-peak signal variation) and frequency domain (using the background power of the optical signal).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
   an optical detector configured to sample asynchronously an optical signal from an optical component; and
   a processor operatively coupled to the optical detector, the processor configured to calculate a metric value of the optical signal without an extinction ratio of the optical signal being measured, the metric value being proportional to the extinction ratio of the optical signal,
   the processor configured to calculate a calibration value based on the optical signal such that the calibration value is calculated by the processor when: (1) a bit rate of the optical signal is greater than an analog bandwidth of the optical detector and (2) a sampling frequency of the optical signal is not less than the analog bandwidth of the optical detector,
   the processor configured to define an error signal based on the calibration value and the metric value of the optical signal, the processor configured to send the error signal to an optical transmitter such that the optical transmitter modifies an output optical signal.

2. The apparatus of claim 1, wherein the processor is configured to send the error signal such that an extinction ratio of the output optical signal of the optical transmitter is within a defined range.

3. The apparatus of claim 1, wherein the metric value of the optical signal is at least one of a variance of the optical signal in a time domain, a standard deviation of the optical signal in the time domain, a peak-to-peak difference in the optical signal in the time domain or a background power of the optical signal in a frequency domain.

4. The apparatus of claim 1, wherein the analog bandwidth of the optical detector is less than the bit rate of the optical signal.

5. A method, comprising:
   sampling asynchronously a first optical signal;
   calculating a metric value of the first optical signal without measuring an extinction ratio of the first optical signal, the metric value being proportional to the extinction ratio of the first optical signal;
   calculating a calibration value based on the first optical signal if a bit rate of the first optical signal is greater than an analog bandwidth of an optical detector that asynchronously sampled the first optical signal and if a sampling frequency of the first optical signal is not less than the analog bandwidth of the optical detector;
   defining an error signal based on the metric value of the first optical signal, and the calibration value; and
   sending the error signal such that a second optical signal is defined based on the first optical signal and the error signal.

6. The method of claim 5, wherein the sending the error signal includes sending the error signal such that an extinction ratio of the second optical signal is within a defined range.

7. The method of claim 5, wherein the metric value of the first optical signal is at least one of a variance of the first optical signal in a time domain, a standard deviation of the first optical signal in the time domain, a peak-to-peak difference in the first optical signal in the time domain or a background power of the first optical signal in a frequency domain.

8. An apparatus, comprising:
   an optical system having an optical detector and a processor operatively coupled to the optical detector, the optical detector configured to detect a first optical signal during a first time period,
   the processor configured to measure an extinction ratio for the first optical signal and calculate a metric value for the first optical signal during the first time period, the processor configured to calculate a calibration value based on the extinction ratio for the first optical signal and the metric value for the first optical signal during the first time period, the optical detector configured to asynchronously sample a second optical signal during a second time period after the first time period, the processor configured to calculate a metric value for the second optical signal without the optical system measuring an extinction ratio for the second optical signal, the metric value for the second optical signal being proportional to the extinction ratio for the second optical signal, the processor configured to define an error signal based on the metric value for the second optical signal, the optical system configured to modify a third optical signal based on the error signal.

9. The apparatus of claim 8, wherein the optical system has an optical transmitter, the second optical signal is associated with an output optical signal sent by the optical transmitter at a first time, the third optical signal is associated with an output optical signal sent by the optical transmitter at a second time after the first time.

10. The apparatus of claim 8, wherein the optical system has an optical receiver, the second optical signal is associated with a received optical signal received by the optical receiver at a first time, the third optical signal is associated with a received optical signal received by the optical receiver at a second time after the first time.

11. The apparatus of claim 8, wherein the optical system is configured to modify the third optical signal based on the error signal such that an extinction ratio of the third signal is within a defined range.

12. The apparatus of claim 8, wherein the metric value for the second optical signal is at least one of a variance of the second optical signal in a time domain, a standard deviation of the second optical signal in the time domain, a peak-to-peak difference in the second optical signal in the time domain or a background power of the second optical signal in a frequency domain.

13. The apparatus of claim 8, wherein an analog bandwidth of the optical detector is less than a bit rate of the second optical signal.

14. The apparatus of claim 8, wherein:
the optical detector is configured to asynchronously sample the second optical signal without a clock signal associated with the second optical signal and without clock recovery associated with the second optical signal.

15. An apparatus, comprising:
an optical detector configured to detect a first optical signal from an optical component during a first time period; and
a processor operatively coupled to the optical detector, the processor configured to measure an extinction ratio for the first optical signal and calculate a metric value for the first optical signal during the first time period, the processor configured to calculate a calibration value based on the extinction ratio for the first optical signal and the metric value for the first optical signal during the first time period, the optical detector configured to sample asynchronously a second optical signal from the optical component during a second time period after the first time period, the processor configured to calculate a metric value for the second optical signal without an extinction ratio for the second optical signal being measured, the metric value for the second optical signal being proportional to the extinction ratio for the second optical signal, the processor configured to define an error signal based on the metric value for the second optical signal and the calibration value, the processor configured to send the error signal to an optical transmitter such that the optical transmitter modifies an output optical signal.

16. The apparatus of claim 15, wherein the processor is configured to send the error signal such that an extinction ratio of the output optical signal of the optical transmitter is within a defined range.

17. The apparatus of claim 15, wherein the metric value for the second optical signal is at least one of a variance of the second optical signal in a time domain, a standard deviation of the second optical signal in the time domain, a peak-to-peak difference in the second optical signal in the time domain or a background power of the second optical signal in a frequency domain.

18. A method, comprising:
detecting a first optical signal during a first time period;
measuring an extinction ratio for the first optical signal during the first time period;
calculating a metric value for the first optical signal during the first time period; and
calculating a calibration value based on the extinction ratio for the first optical signal and the metric value for the first optical signal during the first time period,
sampling asynchronously a second optical signal during a second time period after the first time period;
calculating a metric value for the second optical signal without measuring an extinction ratio for the second optical signal, the metric value for the second optical signal being proportional to the extinction ratio for the second optical signal;
defining an error signal based on the metric value for the second optical signal and the calibration value; and
sending the error signal such that a third optical signal is defined based on the second optical signal and the error signal.

19. The method of claim 18, wherein the sending the error signal includes sending the error signal such that an extinction ratio of the third optical signal is within a defined range.

20. The method of claim 18, wherein the metric value for the second optical signal is at least one of a variance of the second optical signal in a time domain, a standard deviation of the second optical signal in the time domain, a peak-to-peak difference in the second optical signal in the time domain or a background power of the second optical signal in a frequency domain.

* * * * *